US005140348A

United States Patent [19]

Jamzadeh et al.

[11] Patent Number: 5,140,348

[45] Date of Patent: Aug. 18, 1992

[54] COLOR IMAGE PRODUCTION APPARATUS WITH BORDER COLOR SELECTION

[75] Inventors: Fereidoon S. Jamzadeh, Fairport; Arun Chowdry, Pittsford, both of N.Y.

[73] Assignee: Eastman Kodak Company, Rochester, N.Y.

[21] Appl. No.: 589,950

[22] Filed: Sep. 28, 1990

[51] Int. Cl.$^5$ ............................................. G01D 15/06

[52] U.S. Cl. .................................... 346/157; 355/218; 355/326; 355/328

[58] Field of Search ................ 346/157; 355/326, 327, 355/328, 218; 358/75, 76, 77, 78, 80, 300

[56] References Cited

U.S. PATENT DOCUMENTS

| | | | |
|---|---|---|---|
| 4,417,805 | 11/1983 | Kishi | 355/14 R |
| 4,472,047 | 9/1984 | Stoudt | 355/4 |
| 4,697,913 | 10/1987 | Kuramoto et al. | 355/3 R |
| 4,791,450 | 12/1988 | Mosehauer et al. | 355/4 |
| 4,803,520 | 2/1989 | Tomosada et al. | 355/7 |
| 4,862,219 | 8/1989 | Yoshida et al. | 355/202 |
| 4,907,075 | 3/1990 | Braudaway | 358/75 |
| 4,908,663 | 3/1990 | Gunji | 355/218 |
| 4,980,723 | 12/1990 | Buddendeck et al. | 355/218 |
| 4,992,863 | 2/1991 | Moriya | 358/80 |
| 4,994,827 | 2/1991 | Jamzadeh et al. | 346/157 |
| 5,019,859 | 5/1991 | Nash | 355/77 |

FOREIGN PATENT DOCUMENTS 1-166670 6/1989 Japan .

*Primary Examiner*—George H. Miller, Jr.
*Assistant Examiner*—Randy W. Gibson
*Attorney, Agent, or Firm*—Milton S. Sales

[57] ABSTRACT

An electrostatographic color image production apparatus forms a series of large color separation electrostatic latent images of a multicolor image on an image member. Each large latent image is made up of an array of smaller latent images with border regions therebetween. Latent images are formed in the border regions to create a border color in one of the dominant colors of the multicolor image.

44 Claims, 3 Drawing Sheets

COLOR IMAGE PRODUCTION APPARATUS WITH BORDER COLOR SELECTION

CROSS-REFERENCE TO RELATED APPLICATION

This application is related to commonly assigned U.S. patent application Ser. No. 07/532,832 entitled ELECTROSTATIC COLOR PRINTING, filed in the names of Jamzadeh et al on Jun. 4, 1990, now U.S. Pat. No. 5,047,791.

BACKGROUND OF THE INVENTION

1. Technical Field

This invention relates generally to the formation of multicolor images with colored borders automatically inserted around the images.

2. Background Art

In conventional color electrophotography a series of electrostatic images are created on an image member. The images are toned with different colored toners and then transferred in registration to a receiving surface to create a multicolor toner image. The receiving surface may be on an intermediate member which repeatedly brings the receiving surface into transfer relation with the consecutive images to overlay them in registration. Usually however, the receiving surface is a receiving sheet of paper or similar material which has been secured around the periphery of a transfer roller, as described in commonly assigned U.S. patent application Ser. No. 07/532,832 to Jamzadeh et al, filed Jun. 4, 1990, U.S. Pat. No. 5,047,791.

The photofinishing industry worldwide thrives on a few commonly desired sizes of prints. In the United States, for example, nearly all prints are either (in inches) 4×6, 5×7, 8×10 or 11×17. Most photofinishing operations produce many more of the smallest size (4×6) than of the larger sizes. However, some flexibility is necessary in all machines that are not dedicated 100% to snapshots. In silver halide photofinishing, this flexibility is supplied by supplying photographic paper in roll form, exposing and processing whatever pictures in whatever sizes are programmed into the printer and whatever sizes are programmed into the printer and then later cutting the prints to size.

In electrophotography, conventional commercial color apparatus requires the use of cut sheets. That is, a single cut receiving sheet is positioned on the periphery of a transfer roller, the roller is rotated through a nip with a toner image carrying image member once for each color to be transferred, and a multicolor image is thereby formed on the receiving sheet such as shown in the aforementioned application to Jamzadeh et al, wherein a series of different color images are formed on an image drum and transferred to a receiving sheet carried by a transfer roller. Thus, the flexibility of silver halide photofinishing with roll paper is lost, and waste is introduced when prints are made in a format that does not exactly fit the size of the cut sheet.

DISCLOSURE OF INVENTION

It is an object of the present invention to utilize some of the otherwise-wasted portions of cut sheets when prints are made in a format that does not exactly fit the size of the cut sheet.

It is another object of the present invention to provide for the production of image reproductions with borders, wherein the color of the border is automatically selected according to the color content of the image.

In accordance with these and other objects, the present invention provides an electrostatographic color image production apparatus which forms a series of large color separation electrostatic latent images of a multicolor image on an image member. Each large latent image is made up of an array of smaller latent images with border regions therebetween. Latent images are formed in the border regions to create a border color in one of the dominant colors of the multicolor image.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Figure 1:
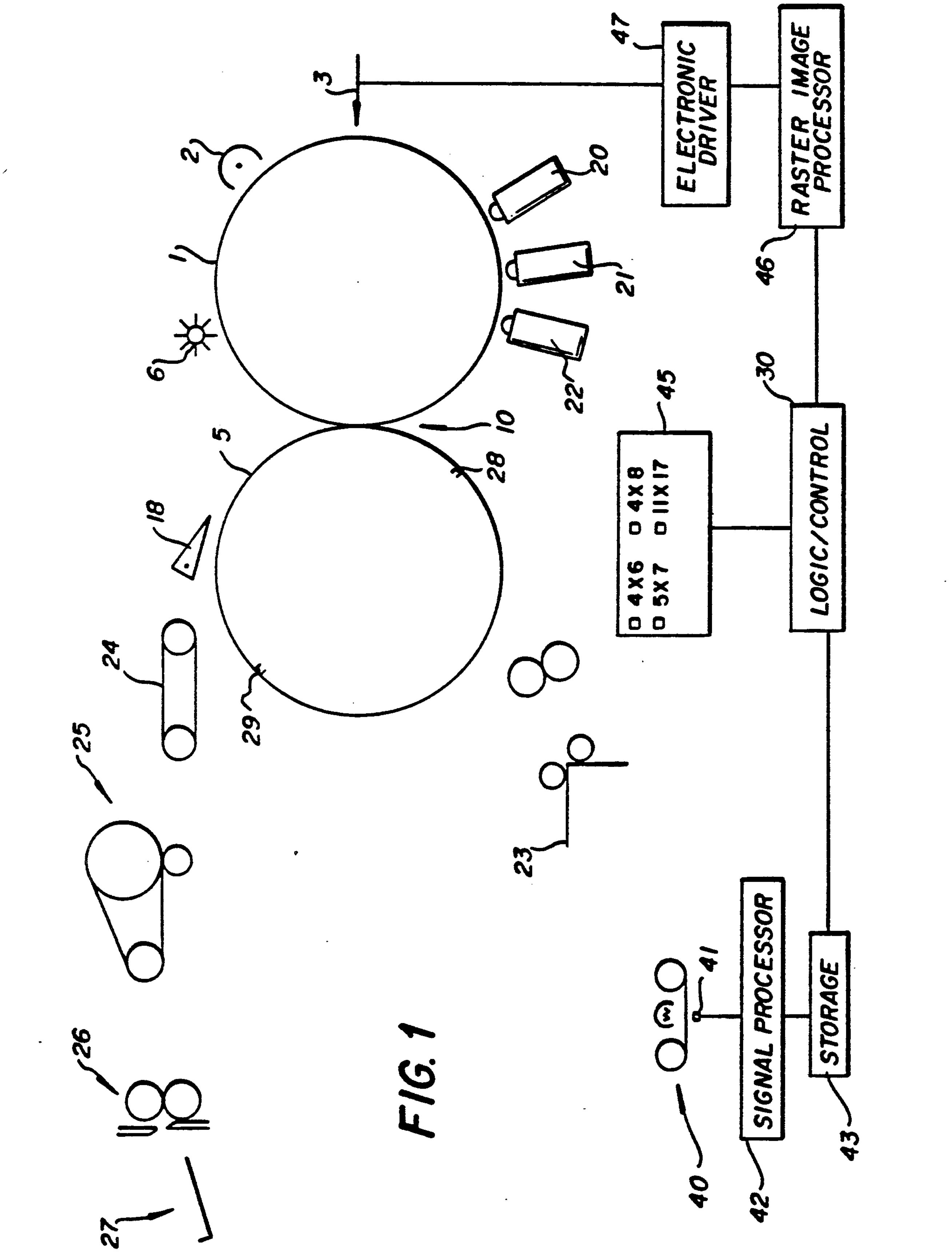
FIG. 1 is a side schematic of a multicolor image forming apparatus.
Figure 2:
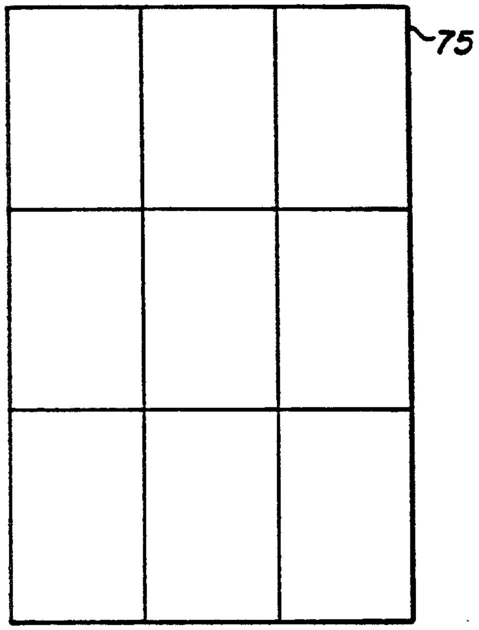
FIGS. 2-5 are top views illustrating receiving sheets having various size image areas prior to cutting.

FIG. 1 illustrates a multicolor image production apparatus utilizing electrophotography. Most of it is conventional. An image member, for example, a photoconductive drum 1, is rotated by a motor, not shown, past a series of electrophotographic stations, all well-known in the art. A charging station 2 uniformly charges the surface of the drum 1. The uniformly charged surface is exposed at an exposure station, for example, laser exposure station 3, to create a series of electrostatic images, each representing a color separation of a multicolor image to be formed. The series of electrostatic images are toned by different color toner development stations 20, 21 and 22, one different color for each image, to create a series of different color toner images. A fourth (black) development station may be provided if desired. The images are then transferred in registration to a receiving sheet carried on the periphery of a transfer roller 5. The drum 1 is cleaned by cleaning station 6 and reused.

The receiving sheet is fed from a receiving sheet supply 23 into a nip 10 between drum 1 and roller 5. As it approaches nip 10 it is secured to drum 5 by a vacuum means, gripping fingers or other mechanism. For example, the leading end of the sheet can e secured by a row of vacuum holes 28 and the trailing end by a row of vacuum holes 29.

After all 3 (or 4) color separation toner images have been transferred to the surface of the receiving sheet, the leading edge of the receiving sheet is stripped from roller 5 by stripping mechanism 18. The receiving sheet is pushed by further rotation of roller 5 onto a sheet transport 24 which carries it to a fixing device 25 and then to a cutter 26. After the sheet has been cut out by the cutter 26 the resulting prints are collected in a tray 27 or more sophisticated print collecting device.

The input for exposure station 3 begins with a data source. In the illustrative embodiment, the data source is a color scanner 40 which includes a color responsive CCD 41 for scanning an original to be printed, for example, 35 mm color negative film. The output from CCD 41 is fed to a signal processor 42 which converts the CCD signal into a form suitable for storing in memory. For example, signal processor 42 can use suitable compression algorithms to save on storage, enhance the image in both its color aspects and its resolution including color masking, halftone screening, etc. all processes well known in the art. After such signal processing, the image information is stored in a suitable storage 43. Because this system demands substantial storage, a preferred form of storage is a system using magnetic disks.

A logic and control 30 is capable of accessing the storage 43 and also receives inputs from various portions of the machine including encoders (not shown) on drum 1 and roller 5 and various stations to manage the timing of the entire apparatus. One of the inputs to logic and control 30 is a print size designation portion 45 of an operator control panel. As shown in FIG. 1, the operator can press a button beside any of four print sizes ranging in inches from, say, 4×6 through 5×7, 8×10, and 11×17. The logic and control 30 then receives the input from the print size designation portion 45 and the memory 43 and supplies that information in an appropriate form to raster image processor 46 which lays out the bit map for the ultimate exposure. The output from the raster image processor 46 is fed to an electronic driver 47 for electronic exposure station 3 to control the intensity of a laser, LED printhead, or the like, making up that station.

The apparatus as shown in FIG. 1 is capable of taking a large size sheet, for example, 12 inches by 18 inches to allow later cutting for the print size produced. Examples of preferred image locations for different sizes of image are shown in FIGS. 2–5. According to FIG. 2, a 12 inch by 18 inch receiving sheet 75 can hold nine 4×6 images exposed edge-to-edge with no borders. The other common sizes will produce some borders with a 12×18 inch receiving sheet.

Figure 3:
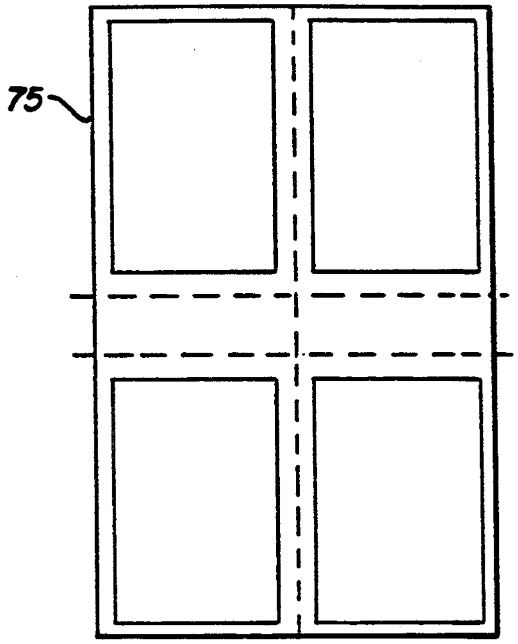

FIG. 3 shows an approach to positioning four 5×7 images on a 12×18 receiving sheet with borders. If the receiving sheet is cut along the dotted lines shown in FIG. 3, a one-half inch border is provided for each print.

Figure 4:
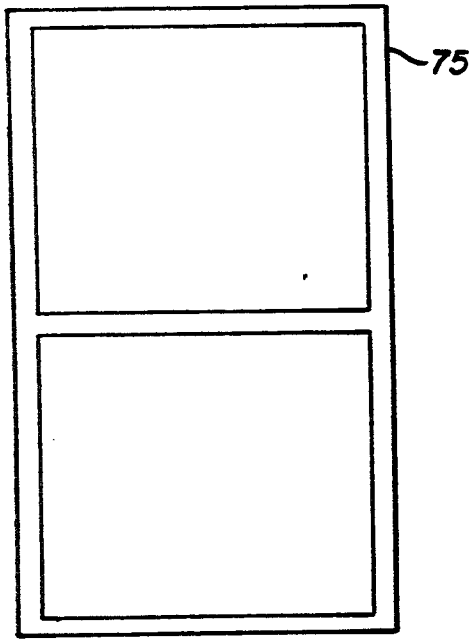
Figure 5:
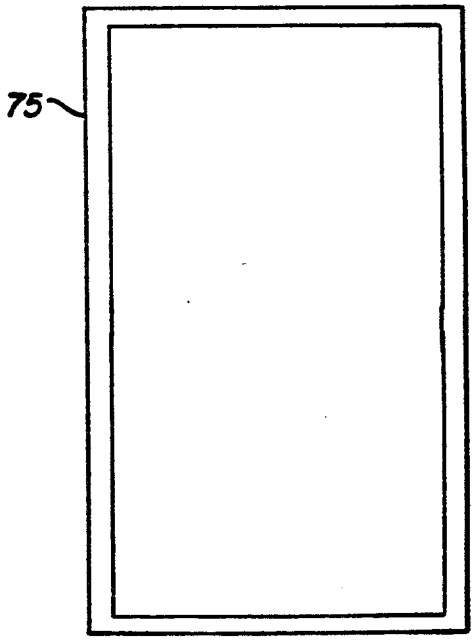

FIG. 4 illustrates two 8×10 images on a 12×18 receiving sheet. With this geometry, if the sheet is cut exactly in half the 8×10's will have one-half inch borders on the top and bottom and 1-inch borders on the sides. FIG. 5 shows one 11×17 print on a 12×18 with one-half inch borders on top, bottom and both sides.

Although snapshots are popular without a border, larger prints often are mounted with a border. The 12×18 size allows production of four 5×7's, two 8×10's and one 11×17 with even borders. The present invention provides an improvement in the selection of colors for borders produced on color copiers. This same technology can be used to permit choice of border color for each print larger than 4×6 in the apparatus shown in FIG. 1, by exposing the border area uniformly for one or more of the color separations.

The 12 inch by 18 inch size is particularly useful in the United States with the standard print sizes discussed above. Most of these sizes have been standard in the United States for printing from 35 mm film for more than 40 years. However, other size receiving sheets may be optimum for other circumstances. For example, in markets in which 4×6 is not the high volume size, integer multiples of whatever that size is is a preferred starting point in determining the preferred receiving sheet size. Further, if customers prefer 4×6 snapshots with borders, then the receiving sheet could be made larger by the amount of the borders. Other arrangements could include a combination of different size prints form the same receiving sheet, for example, seven 4×6 prints and one 5×7. All of this is well within the skill of the art within the general framework of this description.

The slitting, chopping or cutting arts are extremely well developed. Devices are presently available that can be set to slit or cut any sheet at a variety of locations. However, a medium volume photofinishing operation may install a less expensive automatic cutting device that cuts only a single high volume print, for example, 4×6 snapshots and allows all other sizes to be trimmed by hand. In such a device the cutter 26 would be either disablable or there would be a path around it for sizes larger than the high volume size.

As can be seen from FIGS. 2–5, images other than 4×6's do not fill the 12×18 frame completely. The non-image areas of the photoconductor under these conditions (if they occur frequently enough) could begin to degrade nonuniformly with respect to the rest of the film. That is because the same areas are left unexposed and do not develop every time.

According to the present invention, printed margins are electronically added around images that do not fill the frame, in part to uniformly fatigue the photoconductor and in part to enhance different features of the image by automatically selecting colors for the border according to first, second, third, etc. most dominant colors of the image. There is also provided the ability to produce multiple color borders (double, triple, or more) similar to the familiar double and triple matting common to framing art in the picture and painting framing business.

One option for the selection of the color for the border is to use either the first, second, third, etc. most dominant color in the print or a multiple color border of some combination of these colors.

The output of CCD 41 of color scanner 40 is fed to signal processor 42 in three (red, green, and blue) channels. Each pixel will have a value for each of the three channels of, say, from 0 to 255 for an eight-bit signal. A purely red pixel will have values R (red) to 255, G (green) equals 0, and B (blue) equals 0.

Figure 6:
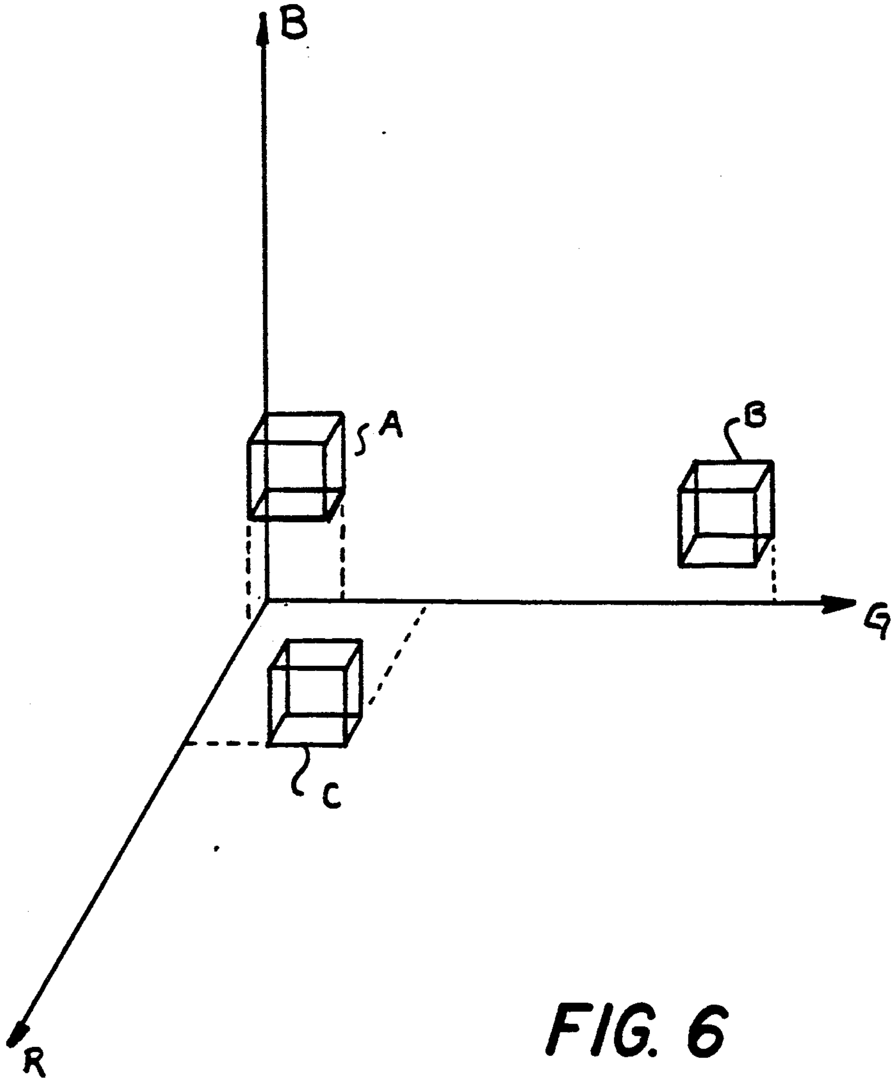
FIG. 6 is a chart representing the sums of all the color values of every pixel in an image.

The volume defined by the coordinate axes of FIG. 6 is divided into a plurality of rectilinear solid areas (boxes) three of which ("A", "B", and "C") are shown in FIG. 6. Of course every position for the entire volume of the coordinate system falls into one box, only three of which are represented in FIG. 6. Each pixel of the image is considered, and the number of pixels of the image that fall within each box is determined.

For example, a pixel having a color made up of a high green value, almost zero red value, and a medium blue value, such as grass, would be box "B" of FIG. 6. Box "A" of that figure would correspond to pixels with a medium to low blue, such as sky, while box "C" would correspond to pixels having moderate green and red values and almost no blue value. Other boxes, not shown, would correspond to other colors.

The number of pixels in the image which correspond to the combinations in each box are counted and stored. Once the entire image has been analyzed, the box containing the most pixels will be the most dominant color (the color that appears most frequently in the image).

Second, third, forth, etc. most dominant colors can also be determined.

The box volumes must be large enough to assure that a dominant color which varies slightly from pixel to pixel is not divided between many small, adjacent boxes. Alternatively, the software may add values from adjacent boxes to compensate for artificial divisions which would tend to hide the true dominant colors of the image.

Logic and control unit 30 can be programmed to select a color for the borders around images by choosing the color with the heaviest content, or with the second, or third, heaviest content.

Many users would prefer that the borders be formed of a color that matches a particular color, in terms of brightness, hue, and saturation, that occurs in the image. Preferably, logic and control unit 30 is programmed accordingly. That is, logic and control unit 30 forms a three-demensional histogram such as illustrated in FIG. 7, wherein the three axes R, G, and B represent the amount of red, green, and blue light, respectively, is detected by CCD 41 with values, say, of from 0 to 255.

The invention has been described in detail with particular reference to a preferred embodiment thereof, but it will be understood that variations and modifications can be effected within the spirit and scope of the invention as described hereinabove and as defined in the appended claims.

We claim:

1. Electrostatographic color image production apparatus, comprising:

an electrostatographic image member;

means for forming a series of large color separation electrostatic latent images of a multicolor image on the image member, each large latent image being made up of an array of smaller latent images with border regions between the smaller latent images;

means for forming electrostatic latent images in the border regions of the color separation electrostatic latent images;

development means for applying toners of different colors to said series of large electrostatic latent images to create a series of color separation toner images corresponding to said color separation electrostatic latent images; and means for transferring said series of toner images in registration to a single receiver to create a transferred multicolor image thereon, said means for forming electrostatic latent images in the border regions being operable to create the border regions of the transferred multicolor image in a dominant color of the multicolor image.

2. An electrostatographic color image production apparatus as set forth in claim 1 wherein said means for forming electrostatic latent images in the border regions is operable to create the border in the first most dominant color of the multicolor image.

3. An electrostatographic color image production apparatus as set forth in claim 1 wherein said means for forming electrostatic latent images in the border regions is operable to create the border in the second most dominant color of the multicolor image.

4. An electrostatographic color image production apparatus as set forth in claim 1 wherein said means for forming electrostatic latent images in the border regions is operable to create the border with an inner and an outer region of different colors.

5. An electrostatographic color image production apparatus as set forth in claim 4 wherein said means for forming electrostatic latent images in the border regions is operable to create the border with an inner and an outer region of the first and second most dominant colors of the multicolor image.

6. An electrostatographic color image production apparatus as set forth in claim 1 wherein said means for forming electrostatic latent images in the border regions is operable to create the border in a color value corresponding to a color value dominant in the multicolor image.

7. An electrostatographic color image production apparatus as set forth in claim 1 wherein said means for forming electrostatic latent images in the border regions is operable to create the border in a color value substantially corresponding to the color value most dominant in the multicolor image.

8. An electrostatographic color image production apparatus as set forth in claim 1 wherein said means for forming electrostatic latent images in the border regions is operable to create the border in a color value substantially corresponding to the color value second most dominant in the multicolor image.

9. An electrostatographic color image production apparatus as set forth in claim 1 wherein said means for forming electrostatic latent images in the border regions is operable to create the border in a color value substantially corresponding to the color value most frequently occurring in the multicolor image.

10. An electrostatographic color image production apparatus as set forth in claim 1 wherein said means for forming electrostatic latent images in the border regions is operable to create the border in a color value substantially corresponding to the color value second most frequently occurring in the multicolor image.

11. An electrostatographic color image production apparatus as set forth in claim 1 wherein said means for forming electrostatic latent images in the border regions is operable to create the border in the first most dominant color of a selected region of the multicolor image.

12. Electrostatographic color image production apparatus, comprising:

an electrostatographic image member;

means for forming a series of large color separation electrostatic latent images of a multicolor image on the image member, each large latent image being made up of at least one smaller latent image with border regions;

means for forming electrostatic latent images in the border regions of the color separation electrostatic latent images;

development means for applying toners of different colors to said series of large electrostatic latent images to create a series of color separation toner images corresponding to said color separation electrostatic latent images; and means for transferring said series of toner images in registration to a single receiver to create a transfered multicolor image thereon, said means for forming electrostatic latent images in the border regions being operable to create the border regions of the transferred multicolor image in a dominant color of the multicolor image.

13. An electrostatographic color image production apparatus as set forth in claim 12 wherein said means for forming electrostatic latent images in the border regions is operable to create the border in the first most dominant color of the multicolor image.

14. An electrostatographic color image production apparatus as set forth in claim 12 wherein said means for forming electrostatic latent images in the border regions is operable to create the border in the second most dominant color of the multicolor image.

15. An electrostatographic color image production apparatus as set forth in claim 12 wherein said means for forming electrostatic latent images in the border regions is operable to create the border with an inner and an outer region of different colors.

16. An electrostatographic color image production apparatus as set forth in claim 15 wherein said means for forming electrostatic latent images in the border regions is operable to create the border with an inner and an outer region of the first and second most dominant colors of the multicolor image.

17. An electrostatographic color image production apparatus as set forth in claim 12 wherein said means for forming electrostatic latent images in the border regions is operable to create the border in a color value corresponding to a color value dominant in the multicolor image.

18. An electrostatographic color image production apparatus as set forth in claim 12 wherein said means for forming electrostatic latent images in the border regions is operable to create the border in a color value substantially corresponding to the color value most dominant in the multicolor image.

19. An electrostatographic color image production apparatus as set forth in claim 12 wherein said means for forming electrostatic latent images in the border regions is operable to create the border in a color value substantially corresponding to the color value second most dominant in the multicolor image.

20. An electrostatographic color image production apparatus as set forth in claim 12 wherein said means for forming electrostatic latent images in the border regions is operable to create the border in a color value substantially corresponding to the color value most frequently occurring in the multicolor image.

21. An electrostatographic color image production apparatus as set forth in claim 12 wherein said means for forming electrostatic latent images in the border regions is operable to create the border in a color value substantially corresponding to the color value second most frequently occurring in the multicolor image.

22. An electrostatographic color image production apparatus as set forth in claim 12 wherein said means for forming electrostatic latent images in the border regions is operable to create the border in a color value substantially corresponding to the color value most frequently occurring in the a selected portion of the multicolor image.

23. Electrostatographic color image production apparatus, comprising:

- an electrostatographic image member;
- means for forming a series of color separation electrostatic latent images of a multicolor image on the image member, said multicolor image having a border region;
- means for forming electrostatic latent images in the border region of the color separation electrostatic latent images;
- development means for applying toners of different colors to said series of large electrostatic latent images to create a series of color separation toner images corresponding to said color separation electrostatic latent images; and
- means for transferring said series of toner images in registration to a single receiver to create a transferred multicolor image thereon, said means for forming electrostatic latent images in the border regions being operable to create the border regions of the transferred multicolor image in a dominant color of the multicolor image.

24. An electrostatographic color image production apparatus as set forth in claim 23 wherein said means for forming electrostatic latent images in the border regions is operable to create the border in the first most dominant color of the multicolor image.

25. An electrostatographic color image production apparatus as set forth in claim 23 wherein said means for forming electrostatic latent images in the border regions is operable to create the border in the second most dominant color of the multicolor image.

26. An electrostatographic color image production apparatus as set forth in claim 23 wherein said means for forming electrostatic latent images in the border regions is operable to create the border with an inner and an outer region of different colors.

27. An electrostatographic color image production apparatus as set forth in claim 26 wherein said means for forming electrostatic latent images in the border regions is operable to create the border with an inner and an outer region of the first and second most dominant colors of the multicolor image.

28. An electrostatographic color image production apparatus as set forth in claim 23 wherein said means for forming electrostatic latent images in the border regions is operable to create the border in a color value corresponding to a color value dominant in the multicolor image.

29. An electrostatographic color image production apparatus as set forth in claim 23 wherein said means for forming electrostatic latent images in the border regions is operable to create the border in a color value substantially corresponding to the color value most dominant in the multicolor image.

30. An electrostatographic color image production apparatus as set forth in claim 23 wherein said means for forming electrostatic latent images in the border regions is operable to create the border in a color value substantially corresponding to the color value second most dominant in the multicolor image.

31. An electrostatographic color image production apparatus as set forth in claim 23 wherein said means for forming electrostatic latent images in the border regions is operable to create the border in a color value substantially corresponding to the color value most frequently occurring in the multicolor image.

32. An electrostatographic color image production apparatus as set forth in claim 23 wherein said means for forming electrostatic latent images in the border regions is operable to create the border in a color value substantially corresponding to the color value second most frequently occurring in the multicolor image.

33. An electrostatographic color image production apparatus as set forth in claim 23 wherein said means for forming electrostatic latent images in the border regions is operable to create the border in the first most dominant color of a selected region of the multicolor image.

34. Electrostatographic color image production apparatus, comprising:

- an electrostatographic image member;

means for forming a series of large color separation electrostatic latent images of a multicolor image on the image member, each large latent image having a border region;

means for forming electrostatic latent images in the border regions of the color separation electrostatic latent images;

development means for applying toners of different color to said series of large electrostatic latent images to create a series of color separation toner images corresponding to said color separation electrostatic latent images; and means for transferring said series of toner images in registration to a single receiver to create a transfered multicolor image thereon, said means for forming electrostatic latent images in the border regions being operable to create the border regions of the transferred multicolor image in a dominant color of the multicolor image.

35. An electrostatographic color image production apparatus as set forth in claim 3 wherein said means for forming electrostatic latent images in the border regions is operable to create the border in the first most dominant color of the multicolor image.

36. An electrostatographic color image production apparatus as set forth in claim 34 wherein said means for forming electrostatic latent images in the border regions is operable to create the border in the second most dominant color of the multicolor image.

37. An electrostatographic color image production apparatus as set forth in claim 34 wherein said means for forming electrostatic latent images in the border regions is operable to create the border with an inner and an outer region of different colors.

38. An electrostatographic color image production apparatus as set forth in claim 37 wherein said means for forming electrostatic latent images in the border regions is operable to create the border with an inner and an outer region of the first and second most dominant colors of the multicolor image.

39. An electrostatographic color image production apparatus as set forth in claim 34 wherein said means for forming electrostatic latent images in the border regions is operable to create the border in a color value corresponding to a color value dominant in the multicolor image.

40. An electrostatographic color image production apparatus as set forth in claim 34 wherein said means for forming electrostatic latent image in the border regions is operable to create the border in a color value substantially corresponding to the color value most dominant in the multicolor image.

41. An electrostatographic color image production apparatus as set forth in claim 34 wherein said means for forming electrostatic latent images in the border regions is operable to create the border in a color value substantially corresponding to the color value second most dominant in the multicolor image.

42. An electrostatographic color image production apparatus as set forth in claim 34 wherein said means for forming electrostatic latent images in the border regions is operable to create the border in a color value substantially corresponding to the color value most frequently occurring in the multicolor image.

43. An electrostatographic color image production apparatus as set forth in claim 34 wherein said means for forming electrostatic latent images in the border regions is operable to create the border in a color value substantially corresponding to the color value second most frequently occurring in the multicolor image.

44. An electrostatographic color image production apparatus as set forth in claim 34 wherein said means for forming electrostatic latent images in the border regions is operable to create the border in a color value substantially corresponding to the color value most frequently occurring in the a selected portion of the multicolor image.

* * * * *

UNITED STATES PATENT AND TRADEMARK OFFICE

CERTIFICATE OF CORRECTION

PATENT NO. : 5,140,348

DATED : August 18, 1992

INVENTOR(S) : Fereidoon S. Jamzadeh, et al

It is certified that error appears in the above-indentified patent and that said Letters Patent is hereby corrected as shown below:

Column 9, Claim 35, line 22, after "claim", "3" should be --34--.

Signed and Sealed this

Fourteenth Day of September, 1993

Attest:

Bruce Lehman

BRUCE LEHMAN

*Attesting Officer* *Commissioner of Patents and Trademarks*